(12) United States Patent
Nishide et al.

(10) Patent No.: US 7,673,935 B2
(45) Date of Patent: Mar. 9, 2010

(54) TEMPERATURE CONTROLLED VEHICULAR SEAT

(75) Inventors: Harutomi Nishide, Utsunomiya (JP); Seiji Waku, Haga-gun (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 12/291,582

(22) Filed: Nov. 12, 2008

(65) Prior Publication Data
US 2009/0121525 A1    May 14, 2009

(30) Foreign Application Priority Data
Nov. 13, 2007   (JP) .............................. 2007-294397

(51) Int. Cl.
A47C 7/72 (2006.01)
(52) U.S. Cl. ................................. 297/180.14
(58) Field of Classification Search ............ 297/180.14, 297/180.13, 180.1
See application file for complete search history.

(56) References Cited

U.S. PATENT DOCUMENTS

| 5,385,382 | A | * | 1/1995 | Single et al. ........... 297/180.13 |
| 5,626,386 | A | * | 5/1997 | Lush ...................... 297/180.13 |
| 5,924,766 | A |   | 7/1999 | Esaki et al. |
| 6,746,076 | B2 | * | 6/2004 | Bogisch et al. ........ 297/180.14 |
| 7,322,643 | B2 | * | 1/2008 | Ishima et al. ............ 297/180.1 |
| 2008/0012398 | A1 | * | 1/2008 | Alacqua et al. .......... 297/180.1 |

FOREIGN PATENT DOCUMENTS

| EP | 411375 A1 * | 2/1991 |
| JP | 05-277020 | 10/1993 |
| JP | 10-297274 | 11/1998 |
| JP | 2003-252036 | 9/2003 |
| JP | 2007-137185 | 6/2007 |

* cited by examiner

*Primary Examiner*—Milton Nelson, Jr.
(74) *Attorney, Agent, or Firm*—Carrier, Blackman & Associates PC; William D. Blackman; Joseph P. Carrier

(57) ABSTRACT

A vehicular seat including: a seat back; a temperature regulation unit which regulates temperature of an air blown from a surface of the seat back and has a heat exchanger; and an exhaust passage which exhaust waste air discharged from the heat exchanger toward the outside of the seat, wherein: the heat exchanger and the exhaust passage are disposed inside the seat back; the exhaust passage has an exhaust portion which opens toward the outside of the seat back; and the exhaust portion is provided on a side of the seat back so as to be oriented downward, the side facing a side wall of the vehicle.

7 Claims, 8 Drawing Sheets

FIG. 9 ing to an embodiment of the present invention, seen obliquely from the upper front of a side wall of the vehicle body.

TEMPERATURE CONTROLLED VEHICULAR SEAT

Priority is claimed on Japanese Patent Application No. 2007-294397, filed Nov. 13, 2007, the content of which is incorporated herein by reference.

BACKGROUND OF THE INVENTION

1. Field of the Invention

The present invention relates to a vehicular seat having a temperature regulation mechanism.

2. Description of the Related Art

A vehicular seat including an air supply mechanism is known, in which the temperature of air is regulated and the air is supplied from a surface of the seat with which an occupant contacts while seated (see Japanese Unexamined Patent Application, First Publication No. H10-297274, for example).

In the vehicular seat disclosed in the above patent document, a heat exchanger for temperature regulation in which a piezo element is built is disposed inside a seat cushion. The air, the temperature of which is regulated by heat exchange in the heat exchanger is blown toward the occupant through the surface skin of both the seat cushion and a seat back. On the other hand, waste air (which is cool during a heater operation, but heated during a cooling operation) from the heat exchanger is exhausted toward the back side of the seat cushion.

However, in the above-described conventional vehicular seat, the air, the temperature of which is regulated by the heat exchanger inside the seat cushion, is directly supplied to the seat cushion, while some of the air is supplied to the seat back through a duct. For this reason, the efficiency of the temperature regulation at the seat back is likely to be low.

In order to solve the above-described issue, it has been studied that an individual heat exchanger for temperature regulation is provided to each of the seat cushion and the seat back. However, in the case where the heat exchanger is provided in the seat back, the waste air from the heat exchanger is exhausted toward the back of the seat back, so that an occupant at the back is likely to be directly suffered from the waste air. As a result, there is concern that an occupant's comfort may be impaired.

In view of the above-described circumstances, the present invention has an object of providing a vehicular seat which enables comfort in a vehicle interior to be improved by enhancing the efficiency of temperature regulation of a seat back without affecting an occupant due to waste air.

SUMMARY OF THE INVENTION

In order to achieve the above-described object, the present invention employs the following. Namely, the present invention employs a vehicular seat including: a seat back; a temperature regulation unit which regulates temperature of an air blown from a surface of the seat back and has a heat exchanger; and an exhaust passage which exhaust waste air discharged from the heat exchanger toward the outside of the seat, wherein: the heat exchanger and the exhaust passage are disposed inside the seat back; the exhaust passage has an exhaust portion which opens toward the outside of the seat back; and the exhaust portion is provided on a side of the seat back so as to be oriented downward, the side facing a sidewall of the vehicle.

According to the above-described vehicular seat, the waste air from the heat exchanger is exhausted downward at the side of the seat back close to a sidewall of the vehicle body.

That is, since the waste air from the heat exchanger inside the seat back is exhausted downward at the side of the seat back facing the sidewall of the vehicle body, it is possible to enhance the efficiency of temperature regulation of the seat back without affecting an occupant due to the waste air. As a result, an occupant's comfort in the vehicle can be improved.

It may be arranged such that the exhaust passage has a duct with which the exhaust portion and the heat exchanger are communicatively connected with each other; and the duct and the heat exchanger are fixed to a frame of the seat back.

In this case, the heat exchanger and the duct can be supported rigidly by the frame of the seat back.

That is, since the heat exchanger and the duct can be supported rigidly by the frame of the seat back, it is possible to suppress the occurrence of vibration and noise.

It may be arranged such that the seat back has a seat back main body which is provided with the heat exchanger at the back side thereof and a seat back board which covers the back side of the seat back main body; and the exhaust portion is provided between the seat back main body and the seat back board.

In this case, since the exhaust portion is covered by the seat back board, the exhaust portion can hardly be seen from the back side of the seat.

That is, since the exhaust portion of the exhaust passage as well as the heat exchanger and the surrounding members can be covered by the seat back board, the quality of appearance of the seat can be improved.

It may be arranged such that the vehicular seat further includes a reclining cover which covers a reclining mechanism for adjusting the tilt of the seat back in the forward and backward direction, wherein the exhaust portion faces a top surface of the reclining cover.

It may be arranged such that a curved portion is formed on the top surface of the reclining cover, the curved portion being curved from the top surface to the side wall of the vehicle.

It may be arranged such that the exhaust passage has substantially an L shaped duct which is made up with an upper side portion extended in the width direction of the seat back and a lateral side portion extended from one end of the upper side portion; an exhaust outlet of the heat exchanger is connected to the upper side portion of the duct; and the exhaust portion is formed on a lower end of the lateral side portion of the duct.

It may be arranged such that the lower end of the lateral side portion of the duct is bent outward toward the side wall of the vehicle.

DETAILED DESCRIPTION OF THE INVENTION

An embodiment of the present invention will be explained below with reference to FIGS. 1 through 8. In the following explanation, unless otherwise specified, "top" and "bottom" refer to the top and bottom in the vertical direction, and "left" and "right" refer to the left and right with respect to the traveling direction of the vehicle.

Figure 1:
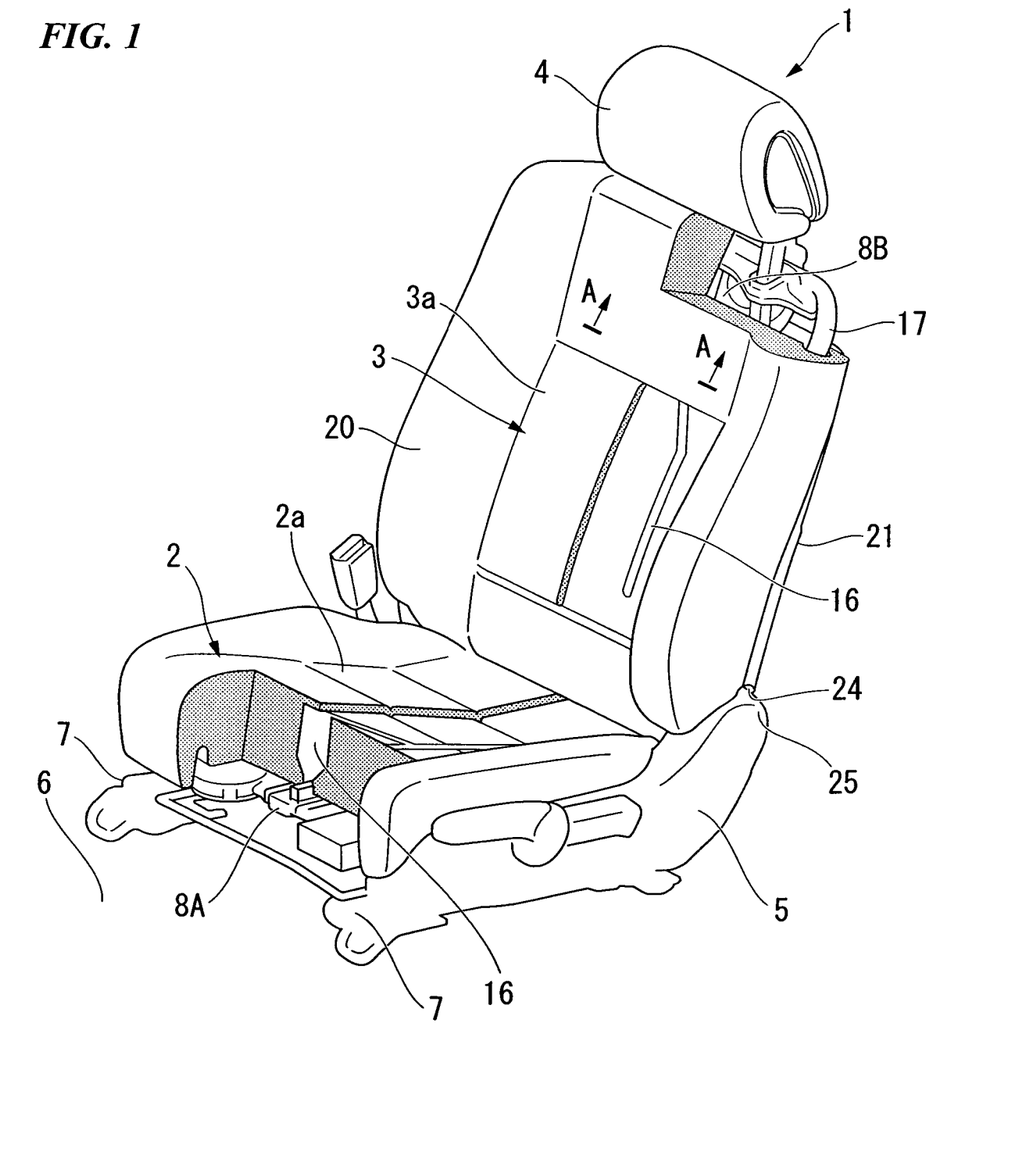
FIG. 1 is a perspective view showing a vehicular seat according to an embodiment of the present invention, seen obliquely from the upper front of a side wall of the vehicle body.

FIG. 1 shows a vehicular seat 1 according to the present invention. The vehicular seat 1 is arranged in the front left side of the vehicle. The vehicular seat 1 has a seat cushion 2 seated by an occupant, a seat back 3 which is a backrest, and a head rest 4 which is arranged on the upper side of the seat back 3 to support the head of an occupant.

The seat back 3 is connected to the rear end portion of the seat cushion 2 with a hinge therebetween, and the tilt of the seat back 3 in the forward and backward direction can be adjusted by a reclining mechanism (not shown in the figure). The numeral 5 in the figure refers a reclining cover which is disposed so as to straddle a range from a left lateral side of the seat cushion 2 to a lower end of the seat back 3 to cover the reclining mechanism. The numeral 6 in the figure refers to the floor inside the vehicle, while the numeral 7 refers to a slide rail with which the vehicular seat 1 can slide on the floor 6.

The seat cushion 2 is provided with a temperature regulation device 8A which allows temperature-regulated air to be blown out through a seat skin 2a. Similarly, the seat back 3 is provided with a temperature regulation device 8B which allows temperature-regulated air to be blown out through a seat skin 3a.

Figure 2:
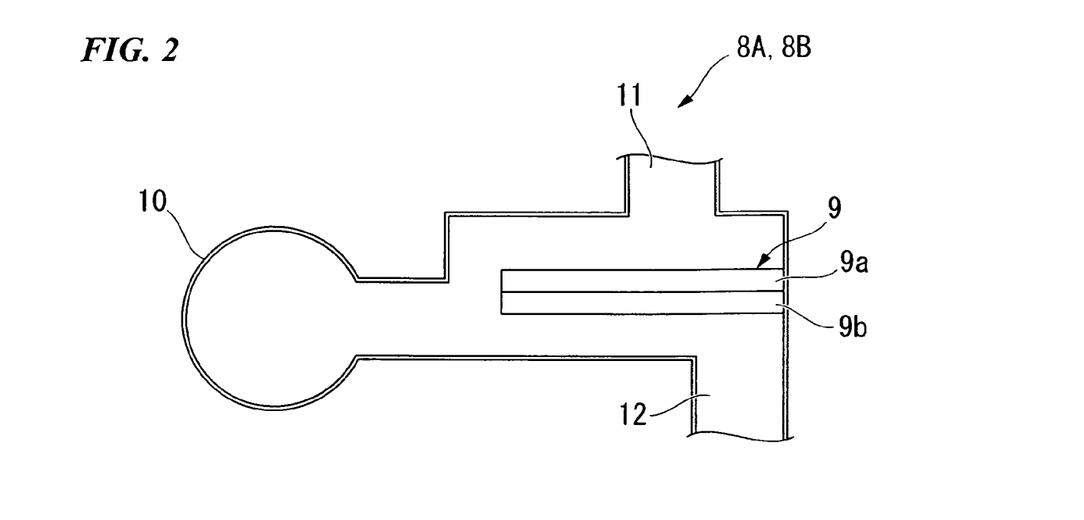
FIG. 2 is a schematic cross-sectional view showing a temperature regulation device used in the vehicular seat according to the embodiment.

FIG. 2 shows the schematic structure of the temperature regulation devices 8A and 8B. As shown in the figure, the temperature regulation devices 8A and 8B have a piezo element 9 which causes a temperature difference between electrodes 9a and 9b by conducting an electric current, a blower 10 which supplies air to the piezo element 9, a supply opening 11 which faces an electrode 9a at one side of the piezo element 9, and a vent 12 which faces an electrode 9b at the other side of the piezo element 9. In the case of the example shown in the figure, air supplied from the blower 10 is diverged so as to face the electrodes 9a and 9b of the piezo element 9, and then the diverged air undergoes heat exchange at each of the electrodes 9a and 9b. Finally, the heat exchanged airs at the electrode 9a and the electrode 9b are supplied to the supply opening 11 and vent 12, respectively. In the piezo element 9, a temperature difference occurs in accordance with a direction of electric current conduction. In a case where the electrode 9a facing the supply opening 11 is heated, the electrode 9b facing the vent 12 is cooled. On the contrary, in a case where the electrode 9a facing the supply opening 11 is cooled, the electrode 9b facing the vent 12 is heated. Accordingly, a cooled air is discharged from the vent 12 during a heater operation in the vehicle interior, while a heated air is discharged from the vent 12 during a cooling operation in the vehicle interior. Hereinafter, the air supplied to the supply opening 11 is referred as a "conditioning air", while the air blown to the vent 12 is referred as "waste air".

Figure 3:
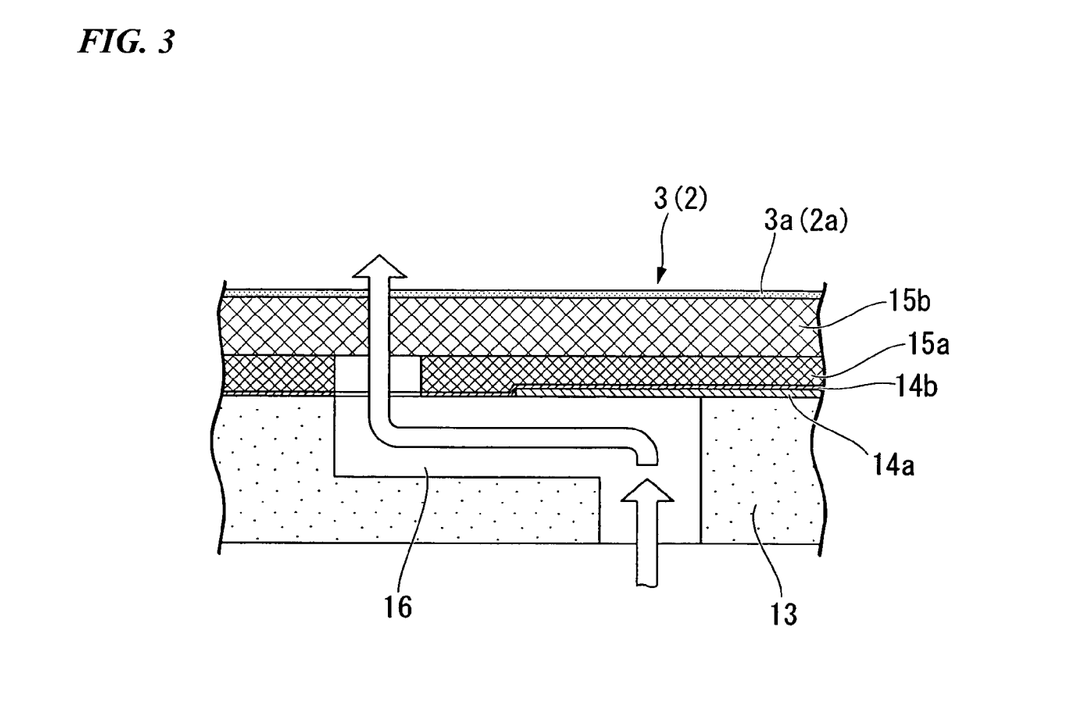
FIG. 3 is a cross-sectional view taken along the line A-A of FIG. 1.

FIG. 3 shows a cross section of the seat back 3 taken along the line A-A of FIG. 1. It is noted that a cross section of the seat cushion 2, which is not shown in the figure, is substantially the same as that shown in FIG. 3. Accordingly, the seat cushion 2 will also be explained below with reference to FIG. 3.

As shown in the figure, the film layers 14a and 14b and mesh layers 15a and 15b are laminated on a top surface of a seat pad 13 of the seat back 3 (seat cushion 2), the seat pad 13 being made of urethane foam or the like. The seat skin 3a (2a) is stretched and disposed on the outside of the mesh layer 15b. If a cloth is employed as the seat skin 3a (2a), air is blown out from fine holes formed on the weave pattern of the cloth. If leather is employed as the seat skin 3a (2a), on the other hand, it is necessary to provide a plurality of holes which penetrate the leather from the one surface to the other surface. A supply passage 16 is formed in the seat pad 13, the film layers 14a and 14b, and the mesh layer 15a so as to communicate with the air outlets 11 of the temperature regulation devices 8A and 8B. The conditioning air supplied to the supply passage 16 disperses in the mesh layer 15b and blown out through wide areas of the seat skin 3a (2a) toward an occupant seated thereon.

The temperature regulation device 8A of the seat cushion 2 (refer to FIG. 1) is fixed to a wire (not shown in the figure) inside the seat cushion 2 and is fixed to a cushion frame. The vent 12 of the temperature regulation device 8A runs to the back surface of the seat cushion 2 through a duct or the like. Therefore, waste air supplied to the vent 12 of the temperature regulation device 8A is exhausted towards the floor 6 underneath the seat cushion 2.

FIGS. 4 through 7 each show the seat back 3. A plurality of wires 18 and sub-frames 19 are fixed to a rectangular frame-shaped seat back frame 17 of the seat back 3. In addition, the above-mentioned seat pad 13, the film layers 14a and 14b, the mesh layers 15a and 15b, the seat skin 3a, and the like are fixed to the front side of the plurality of wires 18 and sub-frames 19, and the periphery of the seat back frame 17. The temperature regulation device 8B is fixed to the seat back frame 17, the wires 18, and the sub-frames 19 from the back side by bolts connection or the like. The seat back main body 20 of the seat back 3 is made up of the above members.

Figure 5:
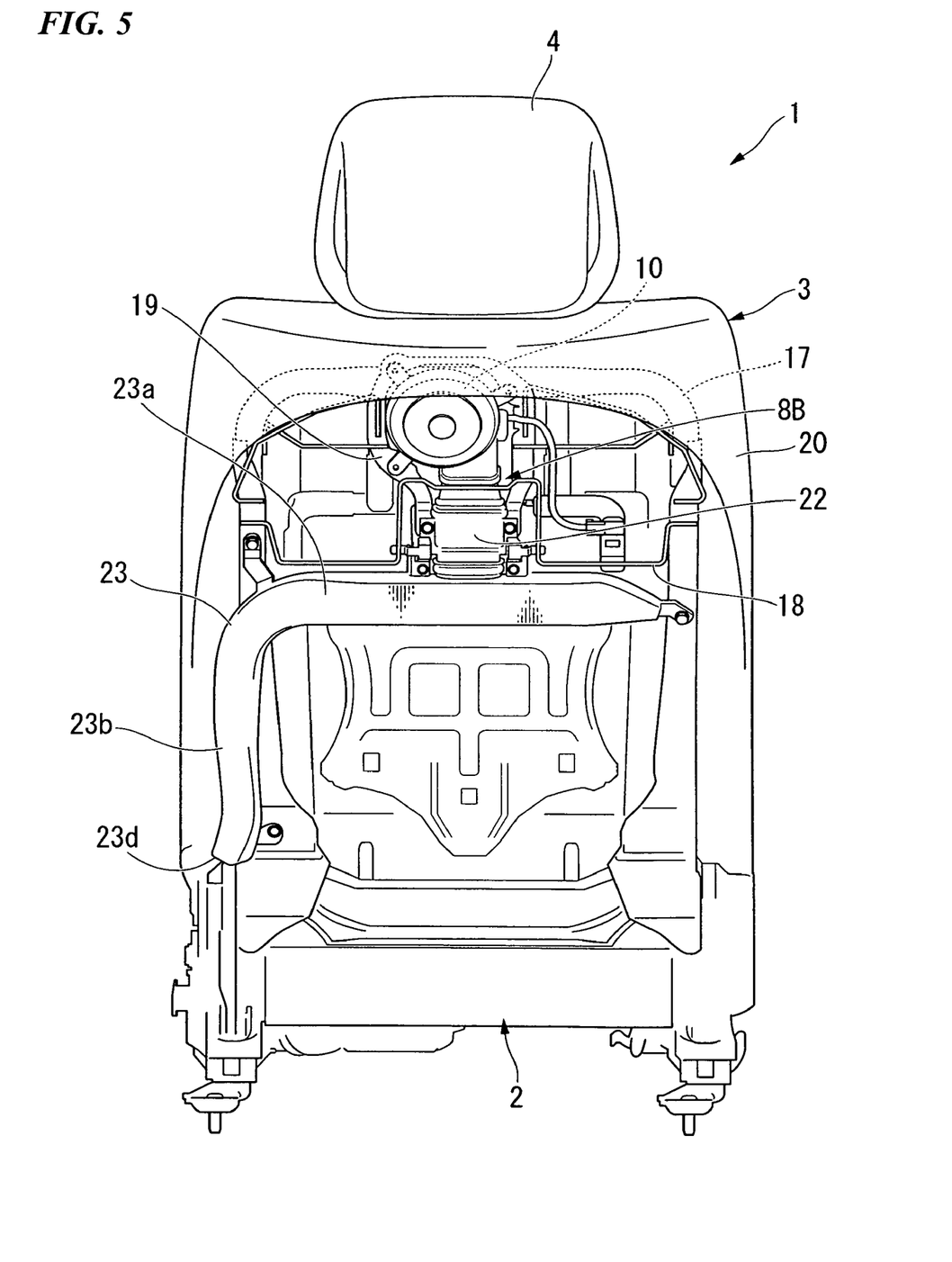
FIG. 5 is a rear elevation view showing the vehicular seat according to the embodiment with a seat back board removed therefrom.
Figure 6:
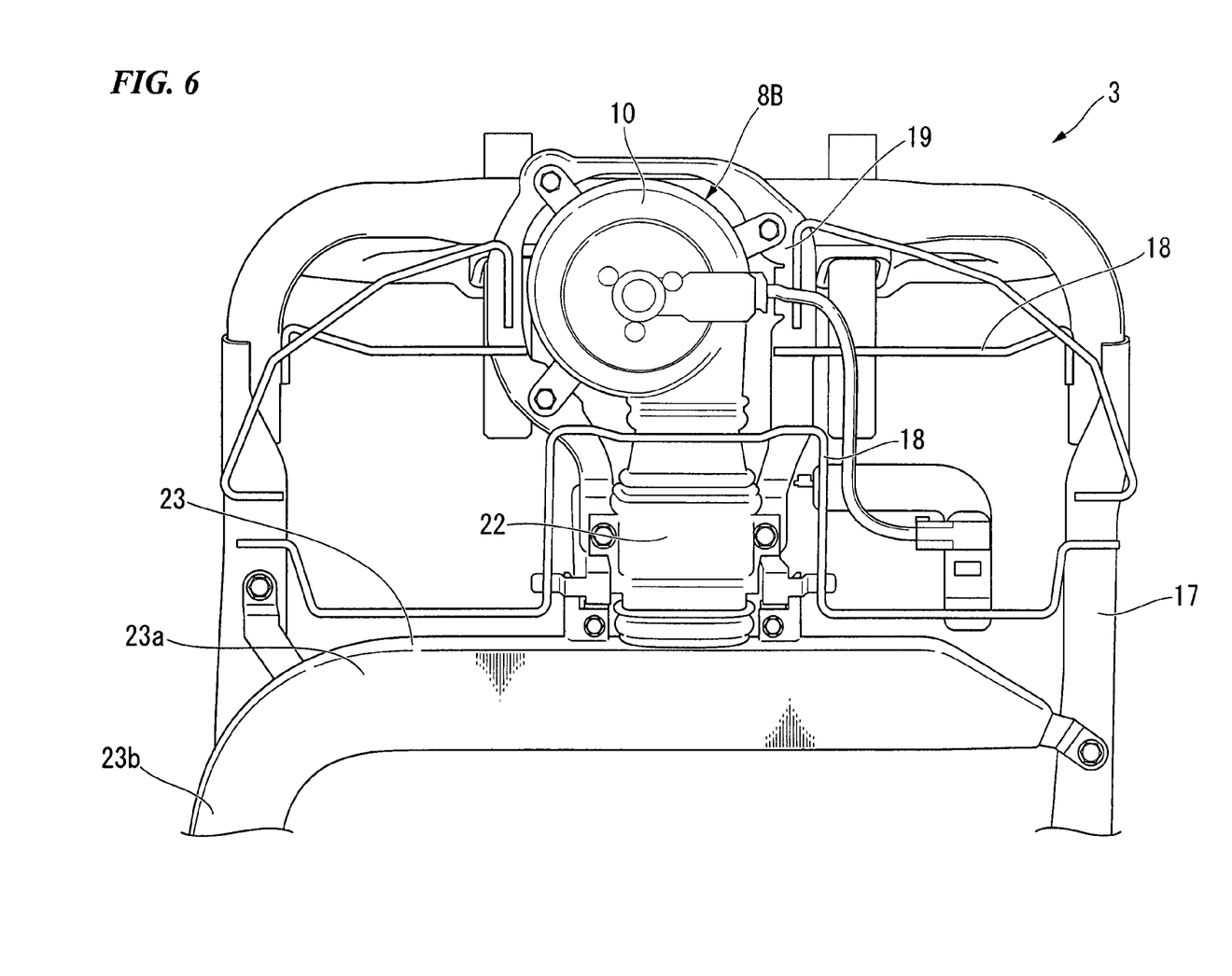
FIG. 6 is a rear elevation view showing the periphery of a seat back frame of the vehicular seat according to the embodiment.

FIG. 5 is a rear elevation view of the seat back main body 20. On the back side of the seat back main body 20, such as the seat back frame 17, the wires 18, the sub-frames 19, and the temperature regulation device 8A are exposed, as shown in the figure, but are covered by a seat back board 21 which is independently provided and fixed to the back of the seat back main body 20.

The temperature regulation device 8B inside the seat back 3 has a heat exchange unit 22 (heat exchanger) including the aforementioned piezo element 9 thereinside and the blower 10 extended from the upper portion thereof. The supply opening 11 formed on the heat exchange unit 22 (refer to FIGS. 2 and 7) has its opening at the front of the seat back 3. The heat exchange unit 22 has the duct 23 which is extended from the bottom portion thereof for exhaust and connected to the aforementioned vent 12 (refer to FIG. 2). The duct 23 is formed in substantially an L shape. An upper side portion 23a, which is one side of the L shaped duct 23, extends along the width direction of the seat back 3, while a lateral side portion 23b, which is the other side of the L shaped duct 23, extends downwardly along the left-hand lateral side of the seat back frame 17. The duct 23 is connected to the back side of the seat back frame 17 with bolts at the lower end of the lateral side portion 23*b* and both ends of the upper side portion 23*a*. The vent 12 of the heat exchange unit 22 (refer to FIG. 2) is connected to substantially a center position of the upper side portion 23*a* in the width direction. In addition, an opening 23*d* is formed at the lower end of the lateral side portion 23*b* of the duct 23 for an outlet opening, while the right end of the upper side portion 23*a* is closed. Accordingly, in the present embodiment, waste air discharged from the heat exchange unit 22 flows from the upper side portion 23*a* towards the lateral side portion 23*b*, and then exhausted from the opening 23*d* positioned at the lower end of the lateral side portion 23*b*.

Figure 7:
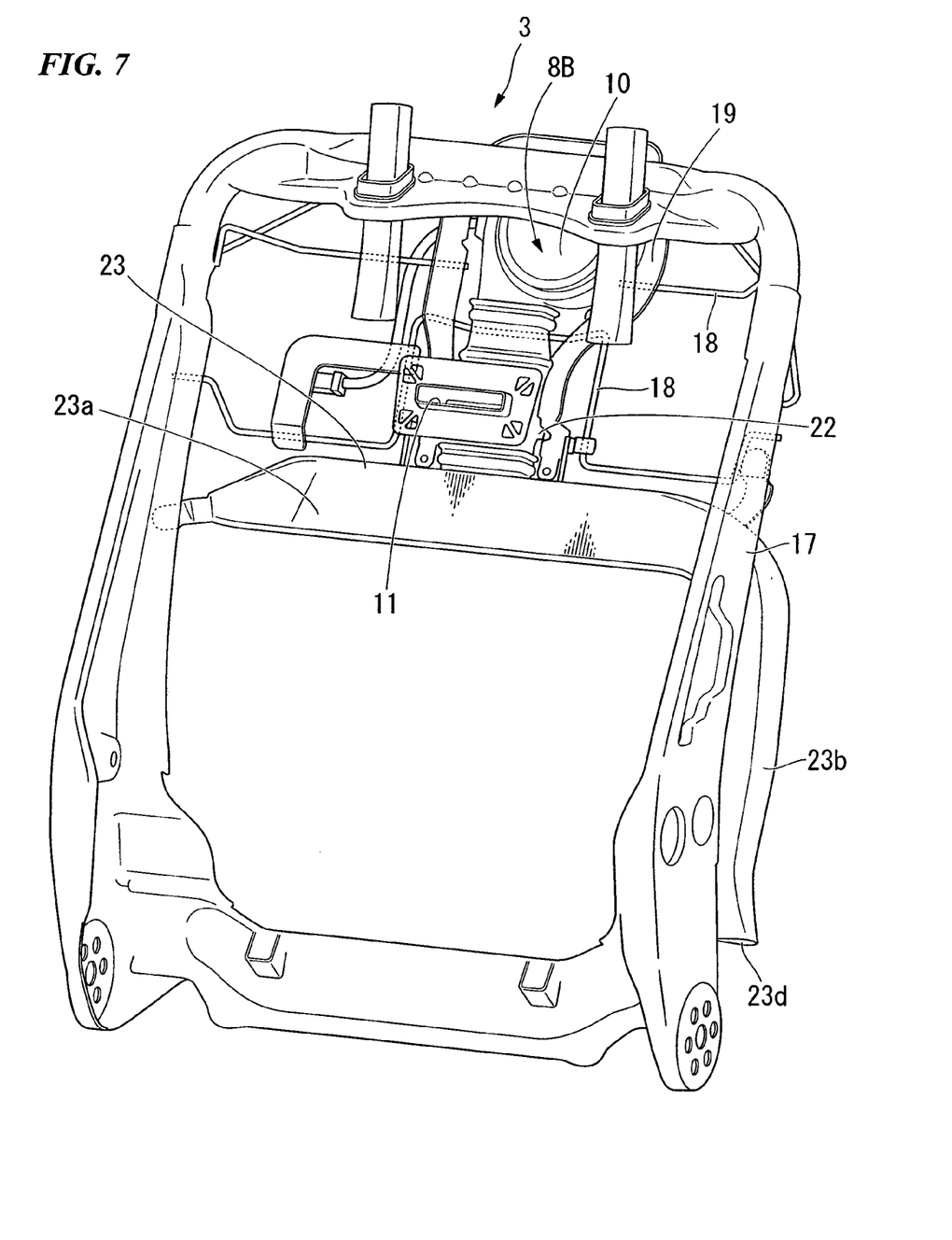
FIG. 7 is a perspective view showing the periphery of the seat back frame of the vehicular seat according to the embodiment, seen obliquely from the upper front.

Moreover, the lower end of the lateral side portion 23*b* of the duct 23 is slightly bent towards a right-hand vehicular sidewall 30, and thereby the opening 23*d* at the lower end is oriented obliquely downward and leftward.

Figure 8:
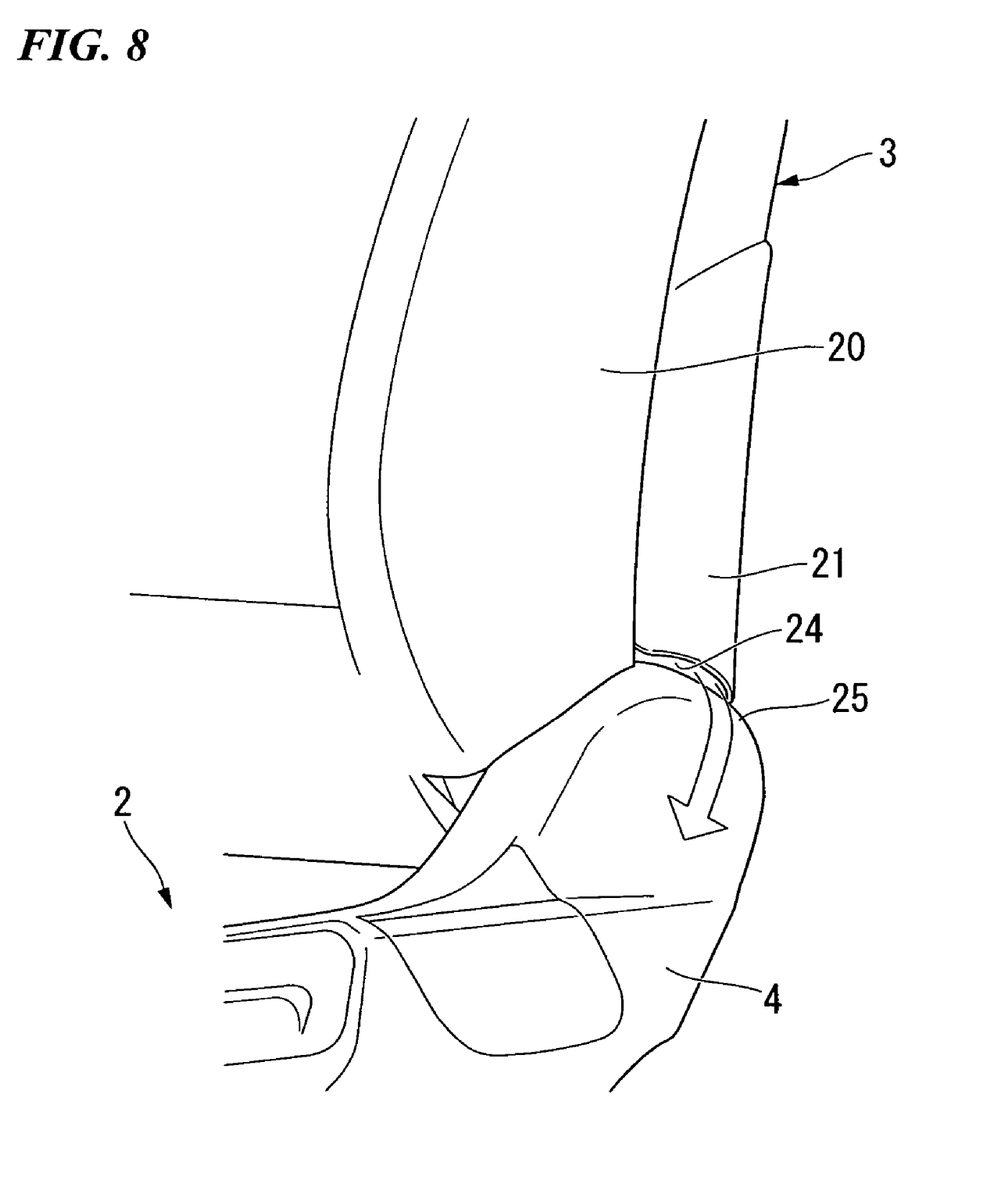
FIG. 8 is an enlarged view showing a part of the vehicular seat according to the embodiment.

The lateral sides of the seat back board 21 are bent forward such that the front end face abuts to the seat back main body 20. The lower ends of the left-hand lateral portions of both the seat back main body 20 and the seat back board 21 face a top face of a rear end portion of the reclining cover 5. A substantially arc shaped gap 24 is formed between the rear end portion of the reclining cover 5, the seat back main body 20, and the seat back board 21 as shown in FIGS. 1 and 8. The opening 23*d* of the duct 23 of the aforementioned temperature regulation device 8B is oriented so as to face the gap 24 inside the seat back board 21. Accordingly, waste air supplied to the opening 23*d* of the duct 23 is exhausted downwardly outside the duct 23 through the gap 24. A curved face 25 gently curved from its top face facing the gap 24 to its left-hand lateral side is formed at the rear end portion of the reclining cover 5, and thereby waste air exhausted from the gap 24 smoothly flows along the curved face 25.

It is noted that, in the present embodiment, the duct 23 and the gap 24 make up an exhaust passage of the present invention, and the lower end of the duct 23 and the gap 24 make up an exhaust portion of the present invention.

As is explained above, in the above-described vehicular seat 1, the temperature regulation devices 8A and 8B are independently provided to the seat cushion 2 and the seat back 3, respectively. Therefore, the efficiency of temperature regulation can be improved in comparison with a case where the temperature regulation device 8A is provided only to the seat cushion 2 and conditioning air is drawn to the seat back 3.

In addition, in the above-described vehicular seat 1, waste air discharged from the temperature regulation device 8B is exhausted downwardly toward the vehicular sidewall 30 through the arc-shaped gap 24 formed between the seat back main body 20, the seat back board 21, and the reclining cover 5. Thereby, there is no effect on an occupant seated behind the vehicular seat 1.

Further, in the above-described vehicular seat 1, since waste air is exhausted toward the vehicular sidewall 30, air blown from an interior air conditioner, which flows downward from substantially the center of the vehicle to the vehicular sidewall 30 does not interfere with the waste air. For this reason, it is possible to keep the air condition inside the vehicle comfortable.

Further, in the above-described vehicular seat 1, the heat exchange unit 22 and the duct 23 of the temperature regulation device 8B are rigidly supported by the seat back frame 17 with the wires 18 and the sub-frames 19 therebetween. Therefore, it is possible to prevent the occurrence of vibration and noise due to the temperature regulation device 8B inside the seat back 3.

Figures 4, 4A:
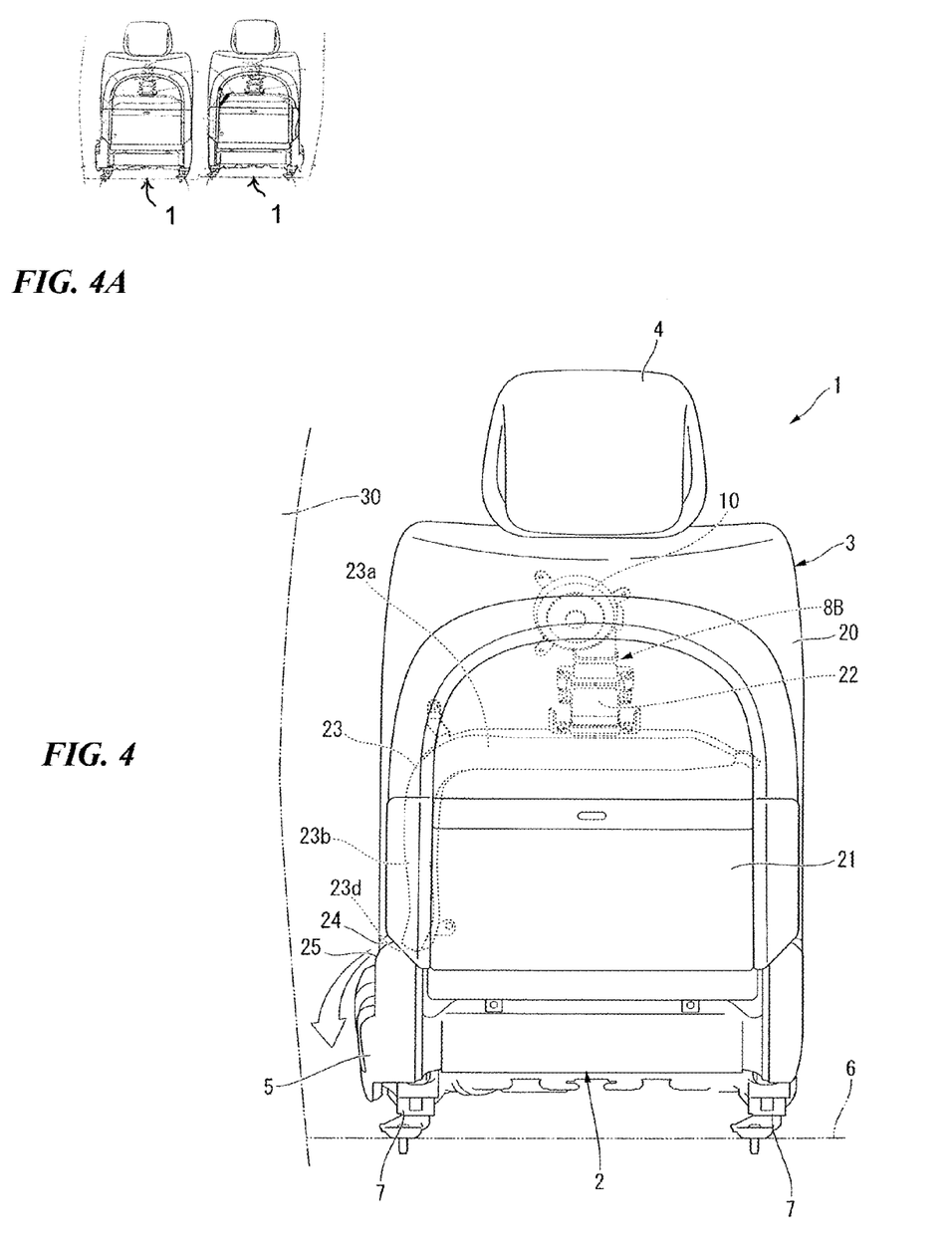
FIG. 4A is a rear elevation view showing a pair of vehicular seats arranged in a side-by-side configuration according to the embodiment.
FIG. 4 is a rear elevation view showing the vehicular seat according to the embodiment.

In addition, in the above-described vehicular seat 1, the back side portion of the seat back main body 20 where the temperature regulation device 8B is fixed is covered with the seat back board 21, and waste air is exhausted to the outside of the seat back 3 through the gap 24 provided on the lateral side of the seat back main body 20 and the seat back board 21, the lateral side facing the vehicular sidewall 30. For this reason, the exhaust portion (gap 24) is unlikely to be seen from the outside, besides the temperature regulation device 8B cannot be seen from the outside. As a result, deterioration of appearance of the vehicular seat 1 can be reduced. As shown in FIG. 4, the exhaust portion flowing outwardly via the gap 24 is directed downwardly and toward the adjacent sidewall. Therefore, the exhaust is directed away from the rear seat, and away from any occupant that may be present therein. As discussed below, the preferred left and right, or side-by-side arrangement of the seats (see FIG. 4A) allows the exhaust 24 to be directed away from the adjacent seat of the side-by-side arrangement.

In the above explanation, although the vehicular seat 1 on the left hand side is described, the same structure can be obtained for the right hand side vehicular seat 1 in which, for example, the outlet of the duct 23 and the gap are provided in a left-right reversal manner.

Figure 9:
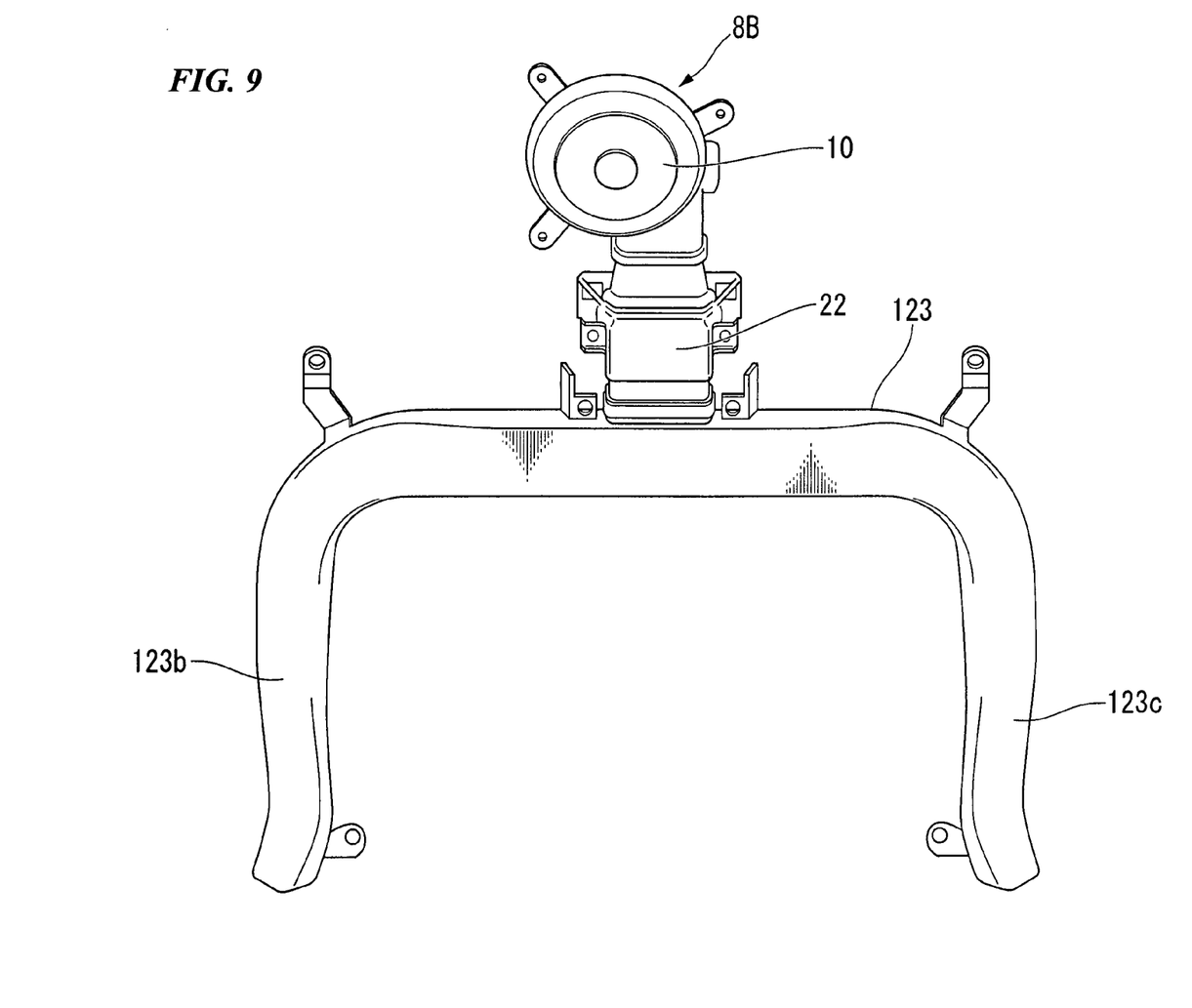
FIG. 9 is a perspective view showing a temperature regulation device used in a vehicular seat according to another embodiment of the present invention.

Further, in the above-described embodiment, it is required that the duct for the left hand seat be prepared separately from the duct for the right hand seat. Alternatively, a laterally symmetric duct 123 may be employed for both the left hand seat and the right hand seat as shown in FIG. 9. In this case, a duct in which lower ends of lateral side portions 123*b* and 123*c* are closed may be formed in advance. The lower end of the lateral side portion 123*b* on the left hand side may be cut out for the left hand side seat, while the lower end of the lateral side portion 123*c* on the right hand side may be cut out for the right hand side seat. It is noted, in FIG. 9, parts the same as those in FIGS. 1 through 8 have the same symbols.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. A seat for a side by side seat arrangement in a passenger compartment of a vehicle, the seat comprising:
    a seat back and a rear end portion;
    a temperature regulation unit which regulates temperature of an air blown from a surface of the seat back and has a heat exchanger; and
    an exhaust passage which exhaust waste air discharged from the heat exchanger toward the outside of the seat, wherein:
    the heat exchanger and the exhaust passage are disposed inside the seat back;
    the exhaust passage has an exhaust portion which opens toward the outside of the seat back; and
    the exhaust portion is provided on a side of the seat back so as to be oriented downwardly, away from the adjacent seat of the side by side seat arrangement.

2. The vehicular seat according to claim 1, wherein:
    the exhaust passage has substantially an L shaped duct which is made up with an upper side portion extended in the width direction of the seat back and a lateral side portion extended from one end of the upper side portion;

an exhaust outlet of the heat exchanger is connected to the upper side portion of the duct; and the exhaust portion is formed on a lower end of the lateral side portion of the duct.

3. The vehicular seat according to claim 2, wherein the lower end of the lateral side portion of the duct is bent obliquely downwardly and away from the adjacent seat of the side by side seat arrangement.

4. The vehicular seat according to claim 1, further comprising a reclining cover which covers a reclining mechanism for adjusting the tilt of the seat back in the forward and backward direction, wherein the exhaust portion faces a top surface of the reclining cover.

5. The vehicular seat according to claim 4, wherein a curved portion is formed on the top surface of the reclining cover, the curved portion being curved from the top surface to a side wall.

6. A seat for use in a vehicle, said seat comprising:

a seat back;

a temperature regulation unit which regulates temperature of an air blown from a surface of the seat back and has a heat exchanger; and an exhaust passage which exhaust waste air discharged from the heat exchanger toward the outside of the seat, wherein:

the heat exchanger and the exhaust passage are disposed inside the seat back;

the exhaust passage has an exhaust portion which opens toward the outside of the seat back; and the exhaust portion is provided on a side of the seat back so as to be oriented downwardly;

wherein the exhaust passage has a duct with which the exhaust portion and the heat exchanger are communicatively connected with each other; and wherein the duct and the heat exchanger are fixed to a frame of the seat back.

7. A seat for use in a vehicle, said seat comprising:

a seat back;

a temperature regulation unit which regulates temperature of an air blown from a surface of the seat back and has a heat exchanger; and an exhaust passage which exhaust waste air discharged from the heat exchanger toward the outside of the seat, wherein:

the heat exchanger and the exhaust passage are disposed inside the seat back;

the exhaust passage has an exhaust portion which opens toward the outside of the seat back; and the exhaust portion is provided on a side of the seat back so as to be oriented downwardly; wherein:

the seat back has a seat back main body which is provided with the heat exchanger at the back side thereof and a seat back board which covers the back side of the seat back main body; and the exhaust portion is provided between the seat back main body and the seat back board.

* * * * *